United States Patent [19]

Furuta et al.

[11] Patent Number: 4,495,772
[45] Date of Patent: Jan. 29, 1985

[54] BRAKE MASTER CYLINDER

[75] Inventors: Yohichi Furuta, Chiryu; Kaoru Tsubouchi, Toyota; Kaoru Nanamura, Anjo, all of Japan

[73] Assignee: Aisin Seiki Kabushiki Kaisha, Kariya, Japan

[21] Appl. No.: 547,447

[22] Filed: Oct. 31, 1983

Related U.S. Application Data

[63] Continuation of Ser. No. 263,723, May 14, 1981, abandoned.

[30] Foreign Application Priority Data

May 16, 1980 [JP] Japan .................. 55-67696[U]

[51] Int. Cl.³ .................................... F15B 7/00
[52] U.S. Cl. ........................ 60/533; 60/589; 92/171
[58] Field of Search ........... 60/533, 594, 589; 92/171

[56] References Cited

U.S. PATENT DOCUMENTS

| | | | |
|---|---|---|---|
| 2,208,575 | 7/1940 | Frank | 92/171 |
| 2,759,329 | 8/1956 | Ponti | 92/171 |
| 2,977,767 | 4/1961 | Randol | 92/171 |
| 3,033,183 | 5/1962 | Erickson | 92/171 |
| 3,059,586 | 10/1962 | Brailsford | 92/170 |
| 3,159,086 | 12/1964 | Schwartz | 92/170 |
| 3,186,174 | 6/1965 | Hayman | 92/171 |
| 3,823,285 | 7/1974 | Dwyer | 60/533 |
| 4,162,616 | 7/1979 | Hayashida | 92/171 |
| 4,249,381 | 2/1981 | Gaiser | 92/171 |

FOREIGN PATENT DOCUMENTS

| | | | |
|---|---|---|---|
| 86725 | 1/1980 | Japan | 92/171 |
| 1051512 | 12/1966 | United Kingdom . | |
| 1120068 | 7/1968 | United Kingdom . | |

Primary Examiner—Abraham Hershkovitz
Attorney, Agent, or Firm—Oblon, Fisher, Spivak, McClelland & Maier

[57] ABSTRACT

A brake master cylinder having a push rod including a body which includes resin material, a metal liner inserted within the body, a seal member disposed between the body and the metal liner, a piston slidably positioned within the metal liner and actuated by the push rod wherein the length of metal liner is slightly longer than the length of large diameter portion of the piston which is in contact with an inside wall of the metal liner plus a length defined by the range in stroke of the piston and a support member for securely holding the metal liner and limiting movement of the push rod.

2 Claims, 1 Drawing Figure

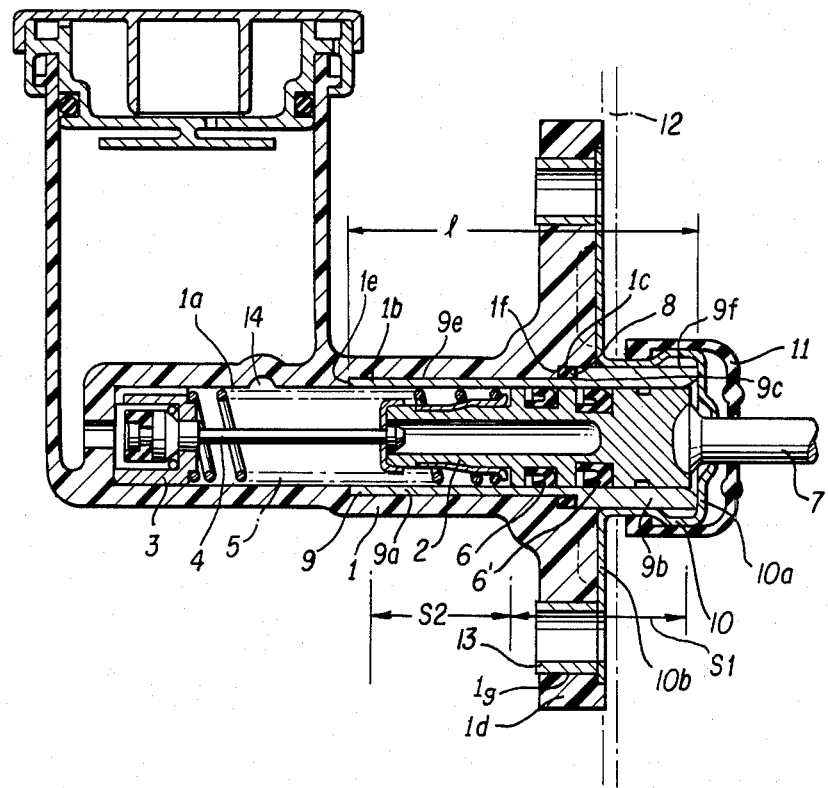

BRAKE MASTER CYLINDER

This application is a continuation of application Ser. No. 263,723, filed May 14, 1981, now abandoned.

BACKGROUND OF THE INVENTION

1. Field of the Invention

This invention relates to a brake master cylinder, and more particularly to a brake master cylinder having a body made of resin material.

2. Description of the Prior Art

Conventionally, a brake master cylinder having a body of resin material has been proposed to lighten the weight of a vehicle. Since the body is made of resin material, there is the possibility that the inside wall of the resin body may be damaged by the sliding movement of a piston positioned within the body. This results in a reduction in the sealing effect and in leakage of fluid.

In order to reduce the above drawbacks, a metal tube has been further proposed to be positioned within the inside wall of the resin body as disclosed in the British Patent Specification No. 1,051,512. The resin body is formed by a molding member in the form of a sleeve-like portion positioned around the metal tube and having a plurality of grooves to thereby securely position the metal tube within the resin body. However, in this prior brake master cylinder, the cost in manufacturing the metal tube is relatively high since the metal tube extends for the whole length of the inside wall of the body and the plurality of grooves have to be formed therein. Furthermore, a gap may occur between the resin body and the metal tube due to the difference in the rate of thermal expansion therebetween especially when the brake master cylinder is at a high temperature. This results in leakage of fluid. If the inside wall of the metal tube is damaged by twisting of the piston or the like, there also is a disadvantage that both the body and metal tube have to be exchanged because the metal tube is integrally formed with the body.

SUMMARY OF THE INVENTION

Therefore, it is an object of the present invention to provide an improved brake master cylinder which obviates the conventional drawbacks mentioned above.

It is another object of the present invention to provide an improved brake master cylinder which provides a good sealing effect.

BRIEF DESCRIPTION OF THE DRAWING

Various objects, features and attendant advantages of the present invention will be evident upon consideration of the sole drawing wherein:

The sole FIGURE is a cross-sectional view of a brake master cylinder according to the present invention.

DETAILED DESCRIPTION OF THE PREFERRED EMBODIMENT

Reference numeral 1 denotes a master cylinder body made of resin material, 2 denotes a piston, 3 signifies a valve assembly retainer, 4 indicates a valve assembly and 5 denotes a return spring for piston 2 which is inserted between piston 2 and retainer 3. Reference numerals 6, 6' indicate piston cups and 7 denotes a push rod which is operatively connected to a brake pedal (not shown).

The inside wall of body 1 has a small diameter portion 1a, middle diameter portion 1b, and large diameter portion 1c. A cylindrical, voidless metal liner 9 made of aluminum, cast iron, carbon steel or the like by extruding has a thin portion 9a and an axial through-hole formed therein and includes a thick portion 9b. Thin and thick portions 9a and 9b of metal liner 9 have a small and large diameter portion 9e, 9f which are inserted within middle and large diameter portions 1b and 1c without substantial gaps, respectively.

The left end of thin portion 9a of metal liner 9 may be brought in contact with a shoulder 1d which is defined by small and middle diameter portions 1a and 1b of body 1 and right end of thick portion 9b extends to the outside of large diameter portion 1c of body 1. The inside wall of metal liner 9 may be on an extension of the line of inside wall of small diameter portion 1a since the through-hole in metal liner is substantially the same as the diameter of small diameter portion 1a. A seal member 8 is positioned within a square space which is formed by a shoulder 1e defined by middle and large diameter portions 1b and 1c and a shoulder 9c defined by thin and thick portions 9a and 9b. The seal member 8 prevents leakage in fluid through between body 1 and liner 9 when the fluid pressure will generate within body 1 by the sliding movement of piston 2 and when the gap may be occurred between resin body 1 and metal liner 9 due to the difference in the rate of thermal expansions therebetween. The fluid pressure which is generated within body 1 by the sliding movement of piston 2 is transmitted to wheel cylinders through a port 14 which is provided in small diameter portion 1a of body 1.

Piston 2 is slidably positioned within liner 9. The length 1 of liner 9 is such that length 1 is slightly longer but of substantially the same length as the lengths S1 plus S2 defined by length S1 of large diameter portion of piston 2 having cups 6 and 6' which is in contact with inside wall of liner 9 and length S2 defined by the range in stroke of piston 2 when brake pedal is depressed.

Reference numeral 10 denotes a support member for liner 9 and has a bottom portion 10a and extension 10b. Bottom portion 10a securely receives liner 9 and extension 10b is secured to flange 1d of body 1. Bottom portion 10a has a hole formed therein through which push rod 7 extends and thus support member 10 also acts as a stopper for push rod 7.

Reference numeral 11 indicates a boot provided on support member 10 and push rod 7 to prevent dust and the like from entering. Support member 10 which holds metal liner 9 may be secured such that extension 10b thereof is securely sandwiched between flange 1d and dashboard 12 shown by the chain dotted line. Otherwise, the support member 10 may be secured such that a metal collar 13 which is welded to extension 10b is securely inserted within the bolt hole 1g of flange 1d.

As will be clear from the foregoing, damage to the inside wall of resin body 1 will be minimized since both sliding surfaces of the piston 2 and liner 9 are made of metal. Fluid leakage due to the difference in the rate of thermal expansion between resin and metal and increase in fluid pressure during brake operation will be prevented by proper arrangement of seal member 8. Only liner 9 may be exchanged by means of removal of boot 11 and support member 10 because liner 9 is inserted within body 1 without integral molding.

Obviously, numerous modifications and variations of the present invention are possible in light of the above teachings. It is therefore to be understood that within the scope of the appended claims, the invention may be practiced otherwise than as specfically described herein.

What is claimed as new and desired to be secured by Letters Patent of the United States is:

1. A brake master cylinder having a push rod and a reservoir, comprising:

a body of resin material having an open and closed end and an inner cylindrical portion which includes a small diameter portion at said closed end, a large diameter portion at said open end and a middle diameter portion located between said large and small diameter portions;

a metal liner inserted within said body wherein said metal liner includes a through-hole formed therein which has substantially the same diameter as said small diameter portion of said body and wherein an outer diameter portion of the metal liner includes a small outer diameter portion which engages with said middle diameter portion of said body and a large diameter portion which engages with said large diameter portion of said body and wherein said metal liner further comprises a voidless cylindrical liner;

seal means positioned in an annular space formed by said middle and large diameter portions of said body and said small and large diameter portions of said metal liner;

a piston including piston cup means formed in a large diameter portion of said piston, said piston being slidably positioned within said through-hole of said metal liner and directly actuated by said push rod, wherein the length of said metal liner is slightly longer but of substantially the same length as a length of said large diameter portion of said piston plus a length defined by a range of stroke of said piston;

a support member for securely holding said metal liner and limiting movement of said push rod, said body further including a flange portion;

a dashboard member connected to said flange of said body wherein said support member includes at one end thereof an extension securely positioned between said flange portion of said body and said dashboard member and wherein said flange portion has a hole formed therein; and a metal collar member secured to said extension of said support member and securely positioned within said hole in said flange portion of said body and wherein said body includes an outlet port and a hole for communicating with said reservoir formed in said small diameter portion of said body and, said outlet port and said hole are open to said small diameter portion of said body.

2. A brake master cylinder as set forth in claim 1, wherein a portion of said large diameter portion of said metal liner extends outside said body.

* * * * *